B. GIBSON.
AUTOMATIC NUT TIGHTENING DEVICE.
APPLICATION FILED MAR. 7, 1919.
1,327,152.
Patented Jan. 6, 1920.
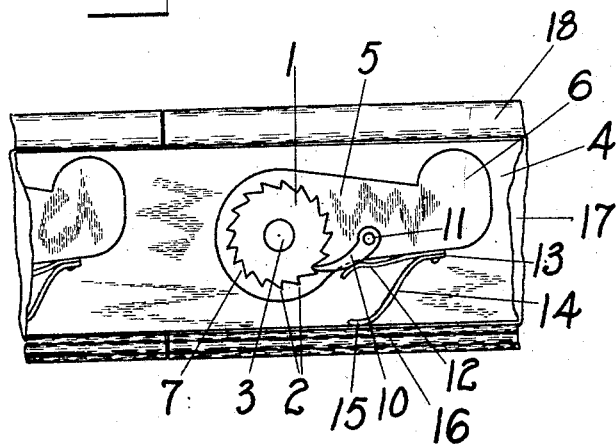
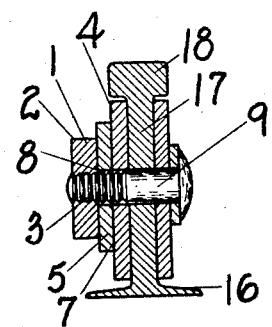
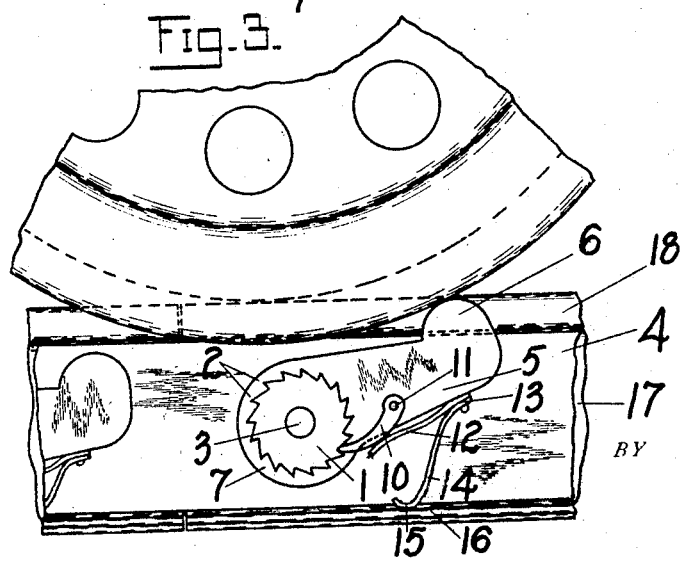
INVENTOR
B. GIBSON.
BY Adam E Fisher
ATTORNEY

UNITED STATES PATENT OFFICE.

BEDELL GIBSON, OF NICHOLLS, GEORGIA.

AUTOMATIC NUT-TIGHTENING DEVICE.

1,327,152.

Specification of Letters Patent. Patented Jan. 6, 1920.

Application filed March 7, 1919. Serial No. 281,297.

*To all whom it may concern:*

Be it known that I, BEDELL GIBSON, a citizen of the United States, residing in the city of Nicholls and State of Georgia, have invented a new and useful Improvement in Automatic Nut-Tightening Devices, of which the following is a specification, reference being had to the accompanying drawings.

This invention pertains to automatic nut tighteners and is especially designed for the purpose of supplying a nut tightener for use upon railroads, for joining the ends of rails.

The primary object of the invention is to provide an automatic nut tightener of the character above described, which may be mounted upon the threaded end of the usual bolt, which passes through the web of a railroad rail and fish-plates, for the purpose of locking the abutting ends in alinement.

Another object is to produce such a device in a simple, practical and efficient form and to so mount same upon the bolt aforesaid and in such relation to the tread of the rail, that a passing car wheel will operate automatically to tighten said nut, should same work loose, upon the threaded end of the bolt.

With these objects in view, attention is called to the accompanying drawing wherein:

Figure 1 is a side elevation of my improved device as mounted upon the threaded end of a bolt used for securing one end of a rail;

Fig. 2 is an end elevation showing the end of a rail, fish-plate and bolt upon which my device is mounted;

Fig. 3 is a detail showing the action of a car wheel on the trigger.

Referring more particularly to the drawings, my invention consists in providing a round nut 1 instead of the usual square form of nut, together with the other coöperative elements described. The periphery of the nut 1 is cut to form a circular rack 2 and the nut so formed is threaded interiorly with threads to engage and mesh with the threads cut upon the end 3 of the bolt 9; this being the usual construction, of course no patentable feature is claimed in this respect. Between the nut 1 so formed and mounted, and the usual fish-plate 4, is located the trigger 5, same being formed with an upstanding end 6 and with a bolt receiving end 7, said end 7 being pierced with the central bolt hole 8, adapted to loosely receive the end 3 of the usual bolt 9 as same passes through the fish-plate 4. Pivotally mounted from the lower side of the trigger 5 is the pawl 10, same being pivoted at the point 11 to the said trigger 5 and normally held in close relation against the circular rack 2 by means of the pawl-spring 12, same being likewise preferably mounted from the trigger 5 at the point 13; and a trigger-spring 14, likewise mounted at the point 13 to the trigger 5 or any other suitable point, is so adjusted that its lower end 15 will bear against the base 16 of the rail 17 so as to normally throw the upstanding end 6 of the trigger 5 up above the tread 18 of the rail 17.

So designed and mounted upon the threaded end of the usual bolt used in conjunction with the usual fish-plates to secure the abutting ends of railroad rails in proper alinement, it is obvious that should the nut 1 work loose upon the bolt 9, the action of the trigger-spring 14 would be to project the end 6 of the trigger 5 upward above the tread 18 of the rail 17, so that the wheels of any passing train, passing over the end 6 would operate to depress said trigger 5, thereby causing the pawl 10 to fall into the circular rack 2 and by engaging successively the teeth of said circular rack 2 to turn up the nut 1 securely against the fish-plate 4. It is likewise obvious that the operation of this device would continue as described until the nut 1 would be so securely turned up into place as to hold by frictional engagement the trigger 5 against any further movement, but this would not occur until the nut 1 were turned well up into place and should said nut again work loose the automatic operation of the device would again be resumed to again tighten the nut.

What I claim to be new and patentable is:

1. An automatic nut tightening device for rails, comprising a bolt; a round nut mounted on the threaded end of the bolt; a ratchet cut on the nut; a trigger having one end loosely engaging the bolt and the free end projecting up above the tread of the rail; a pawl mounted on the trigger and held in sliding engagement with the ratchet of the nut; and means for holding said pawl in sliding engagement with said ratchet, and for projecting the free end of the trigger up above the tread of the rail.

2. An automatic nut tightening device for rails, comprising a bolt; a round nut mounted on the threaded end of the bolt; a ratchet cut around the nut; a trigger having one end loosely engaging the bolt between the nut and the rail and the free end projecting above the rail for engaging the wheels of passing trains; and a pawl mounted upon the trigger for sliding engagement with the ratchet of the nut and adapted to tighten the nut under the action of passing wheels upon the free end of the trigger.

This 15th day of Jan., 1919.

B. GIBSON.

Witnesses:
B. M. TANNER,
E. J. MEEKS.